US00RE42529E

(19) United States
(12) Reissued Patent
Watanabe et al.

(10) Patent Number: US RE42,529 E
(45) Date of Reissued Patent: Jul. 12, 2011

(54) THERMAL FLOW RATE MEASURING DEVICE

(75) Inventors: Izumi Watanabe, Hitachinaka (JP); Junichi Horie, Hitachinaka (JP); Keiichi Nakada, Munich (DE); Kei Ueyama, Nagoya (JP)

(73) Assignees: Hitachi, Ltd., Tokyo (JP); Hitachi Car Engineering Co., Ltd., Hitachinaka-shi (JP)

(21) Appl. No.: 11/143,971

(22) Filed: Jun. 3, 2005

Related U.S. Patent Documents

Reissue of:
(64) Patent No.: 6,571,621
Issued: Jun. 3, 2003
Appl. No.: 09/951,967
Filed: Sep. 14, 2001

(30) Foreign Application Priority Data

Feb. 28, 2001 (JP) ..... 2001-054106

(51) Int. Cl.
*G01F 1/68* (2006.01)
*G01F 5/00* (2006.01)

(52) U.S. Cl. ..... 73/202.5; 73/204.22

(58) Field of Classification Search ..... 73/202.5, 73/204.22, 861, 204.27, 118.2; 180/65.2
See application file for complete search history.

(56) References Cited

U.S. PATENT DOCUMENTS

| | | | | |
|---|---|---|---|---|
| 4,880,078 | A * | 11/1989 | Inoue et al. | 181/232 |
| 4,940,392 | A * | 7/1990 | Adkins | 417/151 |
| 5,133,647 | A * | 7/1992 | Herron et al. | 417/312 |
| 5,186,044 | A * | 2/1993 | Igarashi et al. | 73/114.34 |
| 5,303,584 | A * | 4/1994 | Ogasawara et al. | 73/204.21 |
| 6,336,360 | B1 * | 1/2002 | Weber | 73/204.21 |
| 6,722,196 | B2 * | 4/2004 | Lenzing et al. | 73/204.21 |
| 6,786,089 | B2 * | 9/2004 | Goto et al. | 73/204.21 |
| 7,360,414 | B2 * | 4/2008 | Konzelmann et al. | 73/202.5 |

FOREIGN PATENT DOCUMENTS

| | | |
|---|---|---|
| JP | 3-291528 A | 12/1991 |
| JP | 09287991 | 11/1997 |
| JP | 09304140 | 11/1997 |

OTHER PUBLICATIONS

Japanese Office Action Dated Nov. 8, 2005 (One (1) page).

* cited by examiner

*Primary Examiner* — Jewel V Thompson
(74) *Attorney, Agent, or Firm* — Crowell & Moring LLP

(57) ABSTRACT

A thermal type flow rate measuring device can certainly prevent adhesion of water droplet onto a sensor element and thus achieve high reliability. The thermal type flow rate measuring device includes an auxiliary passage defined within a main passage for introducing a part of fluid flowing through the main passage, a sensor disposed within the auxiliary passage for detecting flow rate of the fluid and capturing means formed on an inner periphery of the auxiliary passage for capturing liquid contained in the fluid and transferring the captured liquid.

28 Claims, 8 Drawing Sheets

THERMAL FLOW RATE MEASURING DEVICE

Matter enclosed in heavy brackets [ ] appears in the original patent but forms no part of this reissue specification; matter printed in italics indicates the additions made by reissue.

BACKGROUND OF THE INVENTION

The present invention relates generally to a flow rate measuring device for detecting a flow rate of a fluid. More particularly, the invention relates to a thermal type flow rate measuring device which defines an auxiliary passage within a main passage flowing a fluid and measuring a flow rate of the fluid flowing through the auxiliary passage.

As prior art of a thermal type flow rate measuring device, there is a thermal type flow meter disclosed in Japanese Patent Application Laid-Open No. Heisei 9(1997)-304140. The disclosed thermal type flow meter is formed with an L-shaped auxiliary passage in a flow passage, and a sensor element for detecting flow rate is arranged within the auxiliary passage.

On the other hand, an air flow meter disclosed in Japanese Patent Application Laid-Open No. Heisei 9(1997)-287991 includes a reversed U-shaped auxiliary passage formed within an air passage. A sensor element for detecting flow rate is arranged in the vicinity of the outlet portion of the auxiliary passage.

In case of the air flow rate measuring device for measuring an intake air of an automotive vehicle, while traveling behind a vehicle splashing a large amount of water under rainy condition, while traveling in heavy rain, rain water may easily pass through an air cleaner to penetrate into an air intake passage in a form of fine mist.

It has been known to artisan in the art that the thermal type air flow rate measuring device inherently cause output error as adhering water droplet on the flow rate detecting sensor element and keeps output error until the adhered water droplet is evaporated completely. When error is output in out put of the air flow rate detecting sensor for automotive vehicle, it becomes difficult to obtain appropriate air/fuel ratio to cause difficulty in maintaining normal engine revolution.

In case of the technology disclosed in the foregoing Japanese Patent Application Laid-Open No. Heisei 9-304140, when moisture penetrates into the air intake passage, it may directly collide on the flow rate detecting sensor element to adhere thereon to cause difficulty in obtaining accurate output.

On the other hand, in case of the technology disclosed in Japanese Patent Application Laid-Open No. Heisei 9-287991, since the flow rate detecting sensor element is disposed in the reversed U-shaped passage. Therefore, possibility that the water droplet directly contact with the flow rate detecting sensor element to adhere thereon, is quite low.

However, even with the U-shaped auxiliary passage structure, it is not possible to completely avoid adhesion of water droplet on the sensor element. Namely, when moisture penetrates into the auxiliary passage, a part of mixture may adhere on the peripheral wall of the auxiliary passage initially in a form of small water droplet. Then, small water droplets are coupled to form large water droplet.

Since large water droplet may be easily brown by air flow, the water droplet thus blown may adhere on the sensor element.

SUMMARY OF THE INVENTION

Therefore, it is an object of the present invention to provide a thermal type flow rate measuring device which can certainly prevent adhesion of water droplet onto a sensor element and thus achieve high reliability.

According to the first aspect of the present invention, a thermal type flow rate measuring device comprises:

an auxiliary passage defined within a main passage for introducing a part of fluid flowing through the main passage;

a sensor disposed within the auxiliary passage for detecting flow rate of the fluid; and capturing means formed on an inner periphery of the auxiliary passage for capturing liquid contained in the fluid and transferring the captured liquid.

In the preferred construction, a thermal type flow rate measuring device further comprises discharging means for discharging the liquid captured by the capturing means out of the auxiliary passage.

The capturing means or the capturing means and the discharge means may be formed with one of a plurality of grooves, a plurality of beam-like ridges and a combination of a plurality of grooves and a plurality of beam-like ridges, the captured liquid may be transferred along the one of a plurality of grooves, a plurality of beam-like ridges and a combination of a plurality of grooves and a plurality of beam-like ridges, A plurality of grooves, a plurality of beam-like ridges and a combination of a plurality of grooves and a plurality of beam-like ridges may extend from upstream side to downstream side in the auxiliary passage in a manner directed from portions on the inner periphery of the auxiliary passage where liquid passing through the auxiliary passage is hardly concentrated to portions on the inner periphery of the auxiliary passage where liquid passing through the auxiliary passage is easily concentrated.

In the alternative, a plurality of grooves, a plurality of beam-like ridges and a combination of a plurality of grooves and a plurality of beam-like ridges extends from upstream side to downstream side in the auxiliary passage in a manner directed from portions of the inner periphery of the auxiliary passage where centrifugal to be applied may be small to portions of the inner periphery of the auxiliary passage where centrifugal force to be applied is large.

A plurality of grooves, a plurality of beam-like ridges and a combination of a plurality of grooves and a plurality of beam-like ridges may extend oblique relative to flow direction of the fluid.

The capturing means and/or the discharge means may have hydrophilic film formed on the inner periphery of the auxiliary passage so that when the liquid adheres on the inner periphery of the auxiliary passage, a contact angle is less than or equal to 30°.

The capturing means and the discharge means may be a plurality of grooves, a plurality of beam-like ridges and a combination of a plurality of grooves and a plurality of beam-like ridges, and another groove coupled with a plurality of grooves, a plurality of beam-like ridges and a combination of a plurality of grooves and a plurality of beam-like ridges, extends from a portion of the inner periphery of the auxiliary passage in the vicinity of an inlet portion of the auxiliary passage and a portion of the inner periphery of the auxiliary passage in the vicinity of an outlet portion of the auxiliary passage, The capturing means may be a plurality of grooves formed on the inner periphery of the auxiliary passage, and the inner periphery of the auxiliary passage of the portions other than those formed the plurality of grooves are provided water repellent characteristics so that when the liquid adheres on the inner periphery of the auxiliary passage, its contact angle thereof becomes greater than or equal to about 90°.

The capturing means may be a plurality of grooves formed in the inner periphery of the auxiliary passage, and the discharge means is through holes formed on at downstream side of the plurality of grooves in communication with the grooves.

According to the second aspect of the present invention, a thermal type flow rate measuring device comprises:

a sensor provided within a main passage through which a fluid flows, for measuring flow rate of the fluid in the main passage;

the main passage being curved in the vicinity of an upstream side of the sensor; and capturing means formed on an inner periphery of the main passage for capturing a liquid carried by the fluid.

According to the third aspect of the invention, a thermal type flow rate measuring device in a vehicle control system including a thermal type flow rate control device, a control unit for controlling a vehicle on the basis of the condition of vehicle detected by the thermal type flow rate measuring sensor, the thermal type flow rate measuring device including an auxiliary passage introducing a part of fluid flowing through a main passage, and a sensor for detecting flow rate of the fluid, for detecting flow rate of the liquid, a liquid capturing means and/or discharging means being provided on an inner periphery of the auxiliary passage.

As set forth above, the grooves and/or the beam-like ridge captures the liquid, such as water droplet to prevent confluence of liquid for growth to increase size of the water droplet and whereby to prevent splashing as blown by flow of the fluid.

Also, with suppressing occurrence of splashing of the liquid, the penetrating liquid can be efficiently discharged out of auxiliary passage. Thus adhering of liquid on the flow rate detecting sensor can be successfully prevented.

A plurality of grooves and/or beam-like ridges are formed on the inner periphery of the auxiliary passage, and, the grooves and/or beam-like ridges are coupled with another groove which extends from the portion in the vicinity of the inlet portion and continuously to be discharged out of the auxiliary passage. By this, adhering of the liquid on the mass production sensor can be prevented.

A plurality of grooves are formed in the inner periphery and the inner peripheral surface of the auxiliary passage other than the portion of the grooves is formed with a water repellent film for capturing in the grooves before growth of liquid through binding. Thus, the liquid adhering on the inner periphery of the auxiliary passage can be transferred easily so that they may be captured before growth of water droplet.

By this, splashing of the liquid can be prevented to avoid adhesion of the water droplet on the flow rate detecting sensor.

The grooves are formed in the peripheral wall of the auxiliary passage, and through openings are formed in lower side of the grooves for discharging captured liquid through the through holes. By this, splashing of liquid can be prevented and also retention of the liquid in the auxiliary passage is prevented.

The main passage is curved at upstream side in the vicinity of the portion where the auxiliary passage is mounted, and on the inner periphery of the curved main passage, the liquid capturing means is formed. For example, on the inner periphery of the curved or bent portion, a plurality of grooves or beam-like ridges are formed to prevent the liquid from splashing of the liquid.

By this, splashing of liquid can be prevented, amount of liquid to penetrate into the auxiliary passage can be reduced to lower probability of adhesion of liquid on the flow rate detecting sensor can be reduced.

With the construction set forth above, liquid may not adhere on the flow rate detecting sensor to permit stable output to realize highly reliable flow meter.

On the other hand, even when contaminant of liquid containing oil droplet, such as engine oil contained in blow-by gas, adhesion of the liquid can be successfully prevented and whereby to prevent variation of characteristics of the sensor due to clear measurement. Also, variation of characteristics of the scanning element is not splashed to prevent penetration can be prevented to whereby prevent contamination by oil to cause variation of oil.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
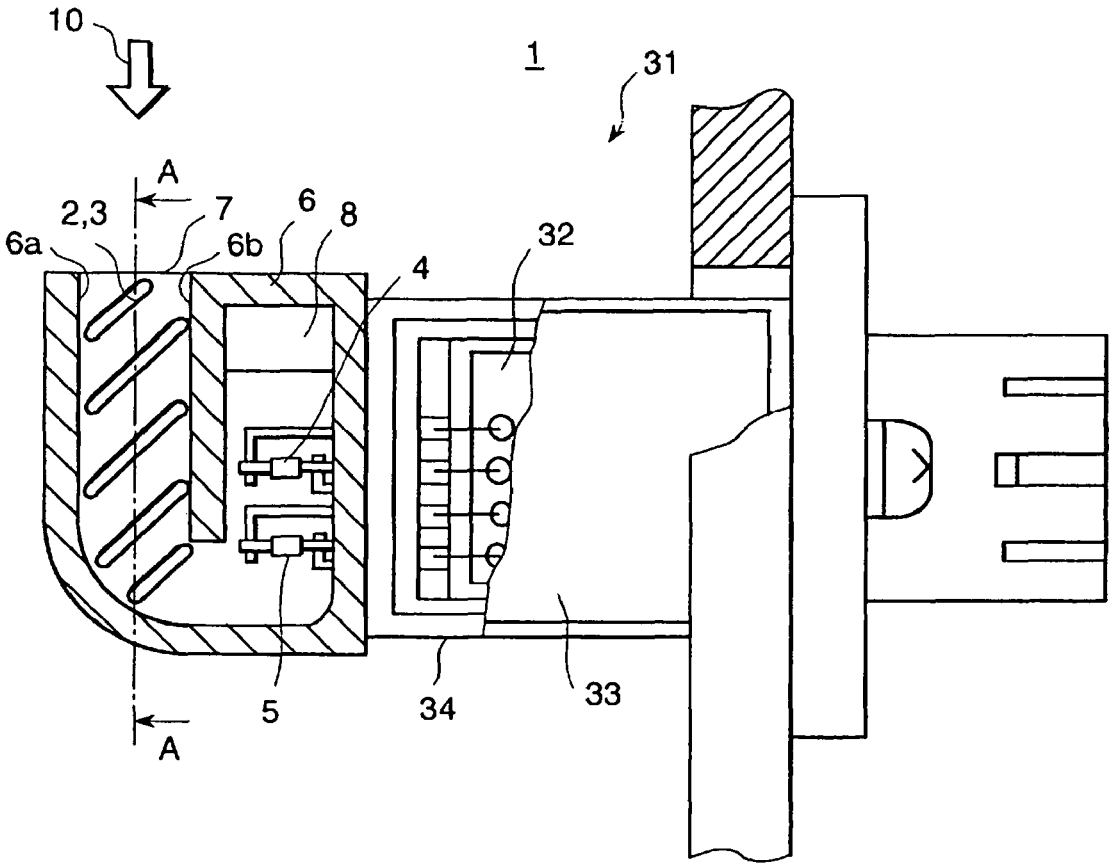
FIG. 1 is a partial section of the first embodiment of a thermal type flow rate measuring device according to the present invention.

FIG. 1 is a partial section of the first embodiment of a thermal type flow rate measuring device according to the present invention.

In FIG. 1, a thermal type flow rate measuring device 1 includes an auxiliary passage 6, through which a part of fluid flowing through a main passage 31. A flow rate measuring sensor element 4 is disposed within the auxiliary passage 6 for detecting flow rate. The thermal type flow rate measuring device 1 also includes a control circuit 32 for driving the flow rate measuring sensor element 4 and externally outputting a flow rate signal, and a housing 34 for receiving the control circuit 32.

On the inner periphery of the auxiliary passage 6 in the vicinity of an inlet portion 7 through which fluid is introduced into the auxiliary passage, a plurality of grooves 2 or beam-like ridges 3 extending oblique in relation to a flow axis 10 of the fluid at an angle greater than 0° and smaller than 90° in clockwise direction (tilted from the inner side surface 6b to the outer side surface 6a of the auxiliary passage 6). The reference numeral 5 denotes a temperature measuring resistor, 33 denotes a cover.

Figure 2:
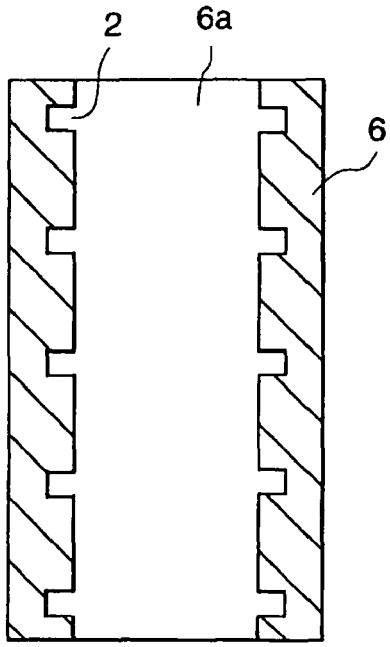
FIG. 2 is a section taken along line A-A of the one embodiment of the thermal type flow rate measuring device of FIG. 1.

FIG. 2 is a section of the auxiliary passage 6 of FIG. 1, as taken along line A-A. On example of a shape of the groove 2. The auxiliary passage 6 is formed with a material, such as PBT resin containing 30% of glass fiber. A thickness of the peripheral wall of the auxiliary passage 6 is about 2 mm, a width of the groove 2 is in a range about 0.3 mm to about 2 mm, and a depth of the groove 2 is in a range about 0.2 mm to about 1 mm.

It should be noted that a depth of the groove 2 is not particularly limited. When a thickness of the peripheral wall of the auxiliary passage 6 is large, the grooves 2 may be further deep.

Figure 3:
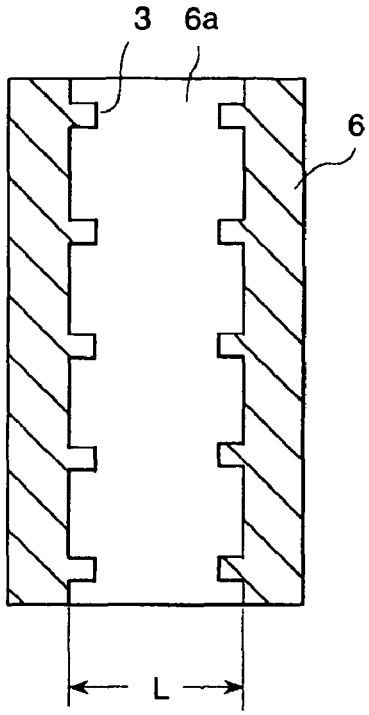
FIG. 3 is a section taken along line A-A of the another embodiment of the thermal type flow rate measuring device of FIG. 1.

On the other hand, FIG. 3 is section of the auxiliary passage 6 of FIG. 1 as taken along line A-A similarly to FIG. 2. One example of the cross-sectional shape of the beam-like ridge 3 is shown in FIG. 3. The thickness of the peripheral wall of the auxiliary passage 6 is about 2 mm, a width of the beam-like ridge 3 is in a range about 0.3 mm to about 2 mm, and height of the beam-like ridge 3 is about 0.2 mm to 1 mm.

It should be noted that when the height of the beam-like ridge 3 is excessively high, it may interfere flow of the fluid. Therefore, the height of the beam-like ridge 3 cannot be made large in unlimited manner. The width L of the normally designed auxiliary passage 6 is about 10 mm. In such case, the height of the beam-like ridge 3 is about 1 mm at most.

Accordingly, when the width of the auxiliary passage 6 is wider, the height of the beam-like ridge 3 can be greater than or equal to 1 mm.

As set forth above, by forming the grooves 2 or the beam-like ridges 3 within the auxiliary passage 6, in which the flow rate measuring sensor element 4 is arranged, adhesion of water droplet 21 on the flow rate measuring sensor element 4 can be successfully prevented.

Mechanism of prevention of adhesion of water droplet will be discussed with reference to FIGS. 4, 5 and 6.

Figure 4A:
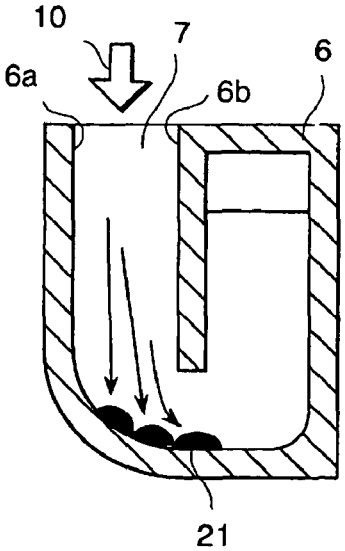
FIGS. 4(a), 4(b) and 4(c) are diagrammatic illustrations showing a behavior of water droplet penetrated into an auxiliary passage for explaining the present invention.
Figure 4B:
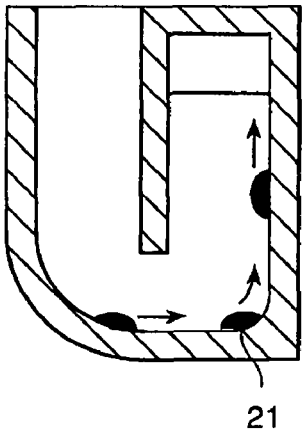
Figure 4C:
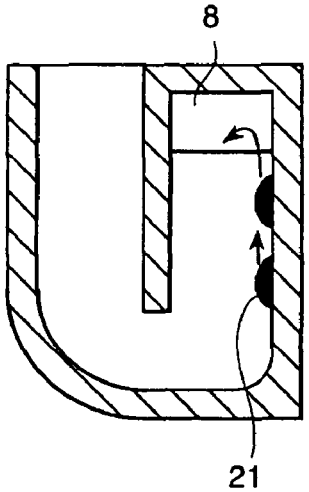
Figure 5A:
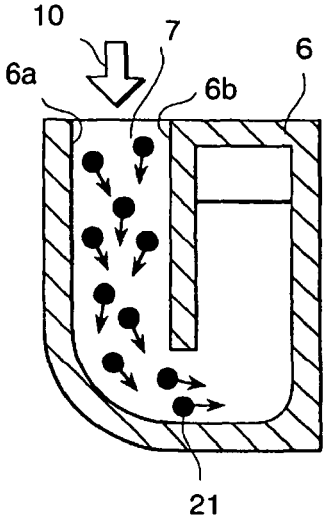
FIGS. 5(a), 5(b) and 5(c) are diagrammatic illustrations showing a behavior of water droplet penetrated into an auxiliary passage for explaining the present invention.
Figure 5B:
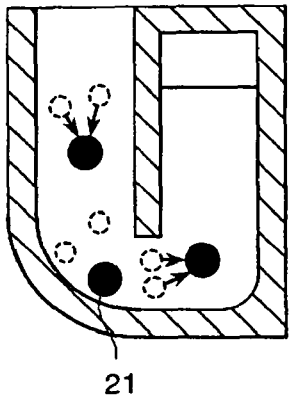
Figure 5C:
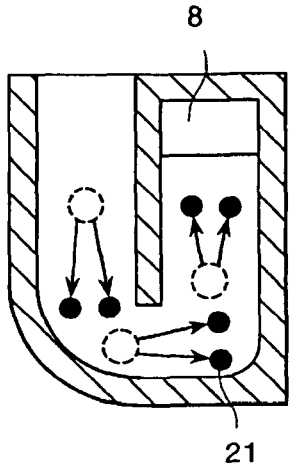
Figure 6A:
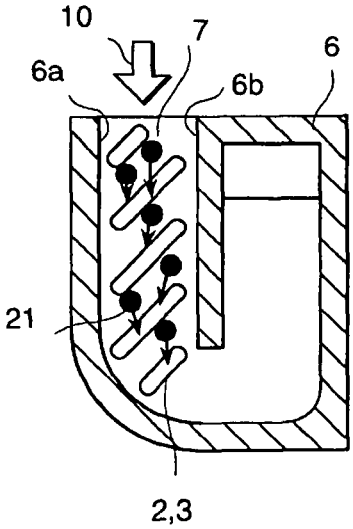
FIGS. 6(a), 6(b) and 6(c) are diagrammatic illustrations showing a behavior of water droplet penetrated into an auxiliary passage for explaining the present invention.
Figure 6B:
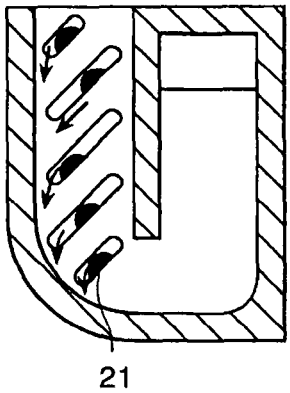
Figure 6C:
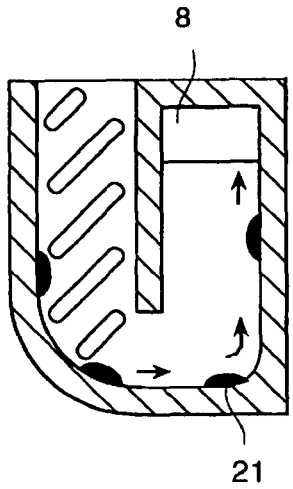

FIGS. 4(a), 4(b) and 4(c) are illustrations showing a manner of primary movement of a water droplet 21 when the grooves 2 or the beam-like ridges 3 in the auxiliary passage 6, and FIGS. 5(a), 5(b) and 5(c) are illustrations showing a manner of movement of a water droplet 21 adhering on the inner periphery of the auxiliary passage 6 of the construction shown in FIG. 4. On the other hand, FIGS. 6(a), 6(b) and 6(c) are illustrations showing a manner of movement of a water droplet 21 adhering on the inner periphery of the auxiliary passage 6 where a plurality of grooves 2 or the beam-like ridges 3 are formed in the auxiliary passage 6.

It should be noted that in FIGS. 4(a) to 6(c), the flow rate measuring sensor element 4 and temperature measuring resistor 5 arranged within the auxiliary passage 6 is eliminated from illustration. However, the flow rate measuring sensor element 4 and the temperature measuring resistor 5 are indeed arranged within the auxiliary passage 6 similar to FIG. 1.

When water droplet 21 penetrates into the auxiliary passage 6, as shown in FIG. 4(a), most of water droplet 21 collides on curved portion on the outer side of the inner periphery 6a of the auxiliary passage 6 bent in generally U-shaped configuration to adhere on the outer side inner periphery. Then, as shown in FIG. 4(b), the water droplet 21 adhering on the inner periphery of the auxiliary passage 6 flows along the periphery to move toward an outlet 8. At this time, centrifugal force generated by flow 10 of the fluid acts on the water droplet 21 to peel off the periphery.

As shown in FIG. 4(c), the water droplet 21 is discharged out of the auxiliary passage 6 through the outlet portion 8. Therefore, water droplet 21 will not adhere on the flow rate measuring sensor element 4.

As set forth above, by employing U-shaped construction of the auxiliary passage, adhesion of water droplet 21 on the flow rate measuring sensor element 4 can be prevented in certain extent.

However, in practice, when the output of the flow rate measuring sensor element 4 is monitored with making mist form moisture penetrates into the main passage 31 from upstream, output fluctuates frequently. Thus it can be appreciated that simply U-shaped auxiliary passage is insufficient to prevent adhesion of moisture on the flow rate measuring sensor element 4.

Therefore, by preparing transparent resin auxiliary passage 6, movement of water droplet in the auxiliary passage when the water droplet 21 is sprayed is observed. As a result, as shown in FIGS. 5(a), 5(b) and 5(c), it can be appreciated that water droplet 21 adheres on the flow rate measuring sensor element 4.

Namely, as shown in FIG. 5(a), a part of the water droplet 21 passing through the auxiliary passage 6 adheres inner peripheral surface (side surface) in the vicinity of the inlet portion 7 of the auxiliary passage 6 between outer side surface 6a and inner side surface 6b. Then, adhered water droplet 21 moves along the side surface as pushed by flow 10 of the fluid. At this time, size of the water droplet 21 is less than or equal to 1 mm in diameter.

While moving along the side surface of the auxiliary passage 6, a plurality of water droplets are aggregated to form greater water droplet 21. Size of the water droplet 21 thus formed becomes about 3 mm in diameter at most, as shown in FIG. 5(b).

As shown in FIG. 5(c), grown water droplet 21 is blown off as pushed by the flow 10 of the fluid. Then, a part of the blown water droplet adheres on the flow rate measuring sensor element 4.

On the other hand, in case of the embodiment shown in FIGS. 6(a), 6(b) and 6(c), a plurality of grooves 2 or a plurality of beam-form ridges 3 are formed on the side surface of the auxiliary passage 6. A plurality of grooves 2 or a plurality of beam-form ridges 3 have structure directed to directions along which large centrifugal force act in the auxiliary passage 6 by tilting at an angle about 45° with respect to flow axis 10 of the fluid.

As shown in FIG. 6(a), the water droplet 21 adheres on the side surface of the auxiliary passage 6 similarly to FIG. 5(a). However, as shown in FIG. 6(b), adhered water droplet 21 contact with a plurality of grooves 2 or a plurality of beam-like ridges 3 and is captured in the grooves 2 or the beam-like ridges 3 by surface tension and is moved along the grooves 2 or the beam-like ridges 3 to the side wall or the outer side periphery 6a on the side where large centrifugal force generated by flow 10 of the fluid in the auxiliary passage 6.

Then, as shown in FIG. 6(c), the water droplet 21 reaching to the outer side periphery 6a is subject to centrifugal force generated by flow of the fluid to move toward the outlet portion 8 along the outer side peripheral 6a. Therefore, water droplet 21 does not peel off the outer side periphery 6a.

As set forth above, by forming a plurality of grooves 2 or a plurality of beam-like ridges 3 (capturing means, discharging means) within the auxiliary passage 6, the water droplet 21 is captured and moved along the outer side periphery 6a, on which large centrifugal force acts, to be discharged from the outlet portion 8 (discharge means) to avoid adhesion of water droplet 21 on the flow rate measuring sensor element 4. Thus, highly reliable thermal type flow rate measuring device can be realized.

It should be noted that a plurality of grooves or a plurality of ridges may also be formed to tilt toward the inner peripheral surface where the water droplets concentrate in the auxiliary passage as actually flowing the water droplets. Then, comparable effect may be obtained.

On the other hand, with applying the shown construction, even when liquid state contaminant containing oil droplet as engine oil contained in blow-by gas, other than water droplet 21, adhesion of oil droplet on the flow rate measuring sensor element 4 can be successfully prevented. Therefore, degradation of variation of characteristics due to oil contamination can be prevented. In this specification, water droplet, oil droplet or the like may generally defined as liquid body.

Figure 7:
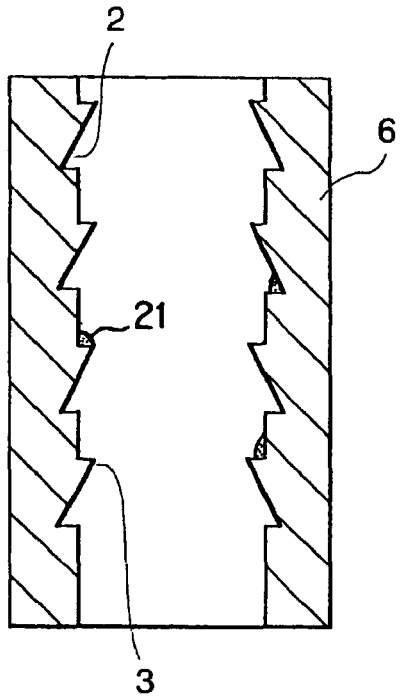
FIG. 7 is a section of an auxiliary passage of a modification of the first embodiment of the present invention.

It should be noted that a plurality of grooves 2 or a plurality of beam-like ridges 3 may be a combination of a plurality of grooves 2 and a plurality of beam-like ridges 3 as shown in FIG. 7 to achieve comparable effect. Therefore, any construction similar to or equivalent of the grooves 2 and the beam-like ridges 3 or combination thereof may be encompassed within the scope of the inventive idea of the present invention.

On the other hand, while the grooves 2 and the beam-like ridges 3 in the shown embodiment are illustrated in straight, it can be curved shape.

Also, in the shown embodiment, while the grooves 2 and the beam-like ridges 3 are in continuous straight shape, the grooves and the beam-like ridges are separated shape as shown by dotted line.

Furthermore, unless limitation in manufacturing, the grooves 2 and/or the beam-like ridges 3 may be formed on the entire inner periphery of the auxiliary passage.

Figure 8:
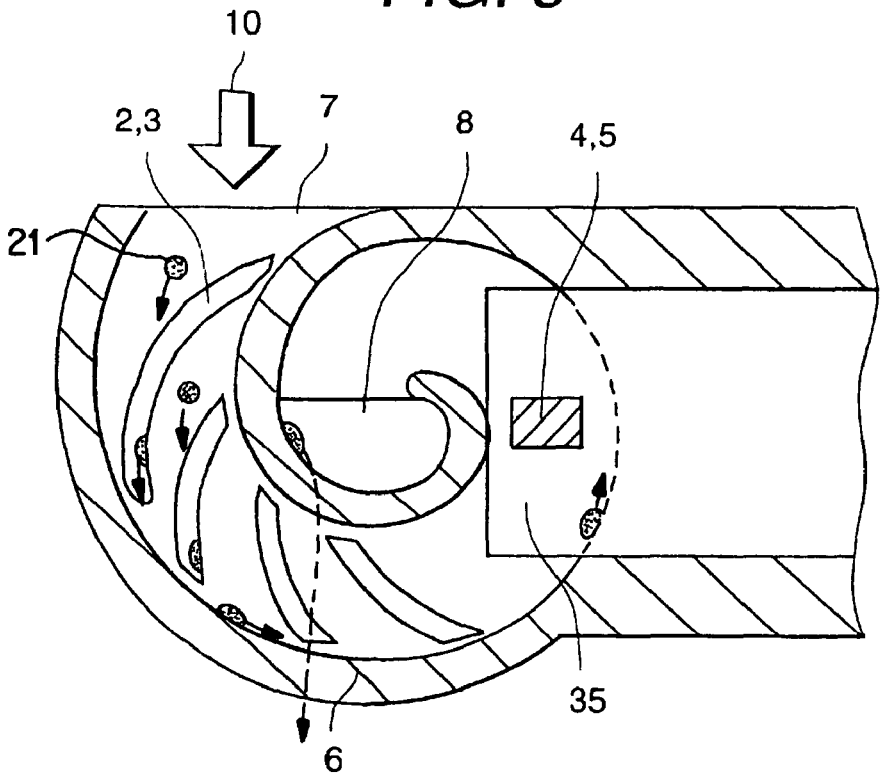
FIG. 8 is a partial section of the second embodiment of a thermal type flow rate measuring device according to the present invention.

Next, second embodiment of the thermal type flow rate measuring device according to the present invention will be discussed with reference to FIG. 8.

The construction of the auxiliary passage 6 as shown in FIGS. 1, 4, 5 and 6, all of the auxiliary passages are formed into U-shaped configuration. However, in the second embodiment of the present invention, the auxiliary passage 6 may be formed into a spiral shape and the flow rate measuring sensor element is the flow rate measuring sensor element 4 shown in FIG. 8.

On upstream sides position of the flow rate measuring sensor element 4, a plurality of grooves 2 or a plurality of beam-like ridges 3 moderately tilted relative to flow 10 of the fluid may be formed. Then these grooves 2 or the beam-like ridges 3 may be formed to extend to the outer periphery portion where large centrifugal force is applied by flow 10 of the fluid.

Water droplets 21 adhering on the auxiliary passage is trapped by the grooves 2 or the beam-like ridges 3 and discharged out of the auxiliary passage 6 through the outlet portion 8. Advantage point of the spiral shape of the auxiliary passage 6 is that since no sharply curved portion is present, the water droplets 21 trapped by the grooves 2 or the beam-like ridges 3 can be easily moved to the outside portion, and the water droplet 21 is easily moved to the outlet portion 8 via the outside portion.

By this, drainage performance can be improved to enhance water droplet adhesion preventing effect.

As set forth above, with the second embodiment of the present invention, similar effect to the first embodiment can be obtained. Furthermore, since the auxiliary passage 6 is formed into spiral shape, the water droplets 21 trapped by the grooves 2 or the beam-like ridges 3 can be easily moved to the outside portion, and the water droplet 21 is easily moved to the outlet portion 8 via the outside portion. Also, drainage performance can be improved to enhance water droplet adhesion preventing effect.

Next, the third embodiment of the thermal type flow rate measuring device according to the present invention will be discussed with reference to FIG. 9.

Figure 9:
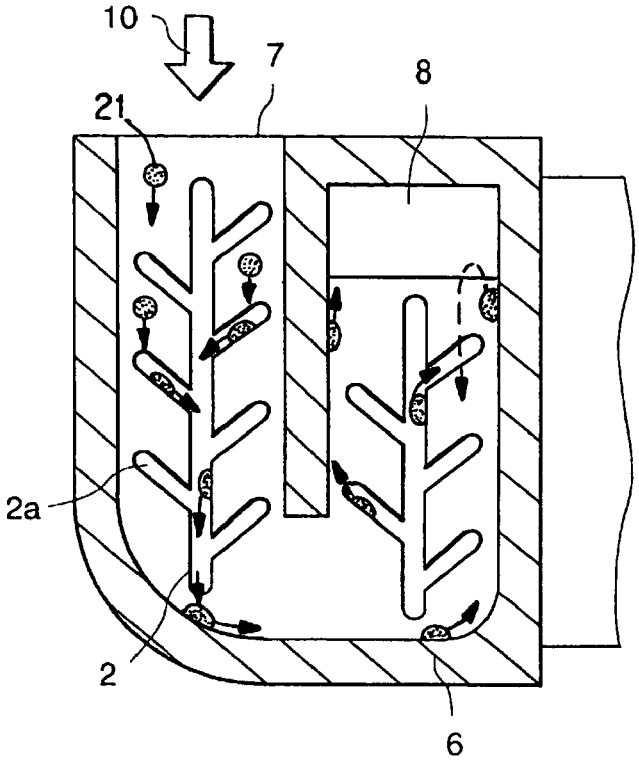
FIG. 9 is a partial section of the third embodiment of a thermal type flow rate measuring device according to the present invention.

In the embodiment shown in FIG. 9, axially extending grooves 2 with branched grooves 2a are formed in the U-shaped auxiliary passage 6. Respective branched grooves 2a are connected to the axially extending groove 2. The axially extending groove 2 may be continuous from a portion in the vicinity of the inlet portion 7 and a portion in the vicinity of the outlet portion 8.

It should be noted that, in FIG. 9, the flow rate measuring sensor element 4 arranged within the auxiliary passage 6 is eliminated from illustration but is indeed arranged in similar manner as illustrated in FIG. 1.

In the construction of the third embodiment of the present invention, the water droplet 21 captured in the grooves 2 and 2a is guided by the grooves 2 and 2a up to the position in the vicinity of the outlet portion 8 and is discharged out of the auxiliary passage 6. With such construction, capturing means and discharging means of water droplet 21 can be formed by the grooves 2 and 2a.

Even with the shown third embodiment, comparable effect as the first embodiment can be achieved.

It should be noted that, while not illustrated, similar effect can be obtained even with the construction, in which the beam-like ridges 3 are coupled with the axially extending groove 2 in place of the branched grooves 2a. On the other hand, in the shown embodiment, the grooves 2 and 2a are connected for integration. However, each individual branched groove 2a is equivalent to the tilted groove 2 in the former embodiment. Therefore, even the groove structure shown in FIG. 9 may be included in the scope of "a plurality of grooves" as defined in the former embodiment.

Next, the fourth embodiment of the thermal type flow rate measuring device according to the present invention will be discussed with reference to FIG. 10.

Figure 10:
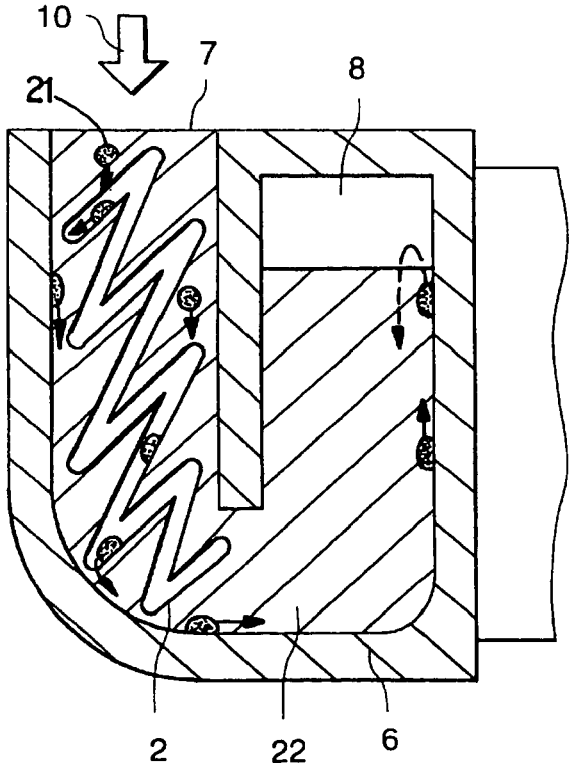
FIG. 10 is a partial section of the fourth embodiment of a thermal type flow rate measuring device according to the present invention.

In the embodiment shown in FIG. 10, a single bent groove 2 in zigzag pattern is formed on the inner periphery of the U-shaped auxiliary passage 6. On the general inner periphery other than the groove 2, water repellent film 22 formed with water repellent cyclic silicon polymer, fluorine type compound or the like, is formed.

It should be noted that "water repellent" referred herein means that normal resin material has contact angle with water in a range of about 70° to about 90°, whereas the water repellent resin has contact angle with water in a range greater than or equal to 90°.

By forming water repellent film 22 on the inner periphery of the auxiliary passage 6, water droplet 21 adhering on the inner periphery of the auxiliary passage 6 is easily moved to be captured by the grooves 2 before aggregated to grow into greater size of water droplet.

With such construction, superior water droplet 21 capturing ability can be obtained in the condition where flow velocity of the fluid is low.

As set forth above, even in the fourth embodiment of the present invention, similar effect as the first embodiment can be obtained.

It should be noted that, in the shown embodiment, single bent groove 2 is employed, However, the single bent groove of zigzag pattern may achieve substantially the same function as the former embodiment, Therefore, single groove as bent in the shown pattern or the like may fall within the scope defined by the wording "plurality of grooves".

Next, the fifth embodiment of the thermal type flow rate measuring device according to the present invention will be discussed with reference to FIG. 11.

Figure 11:
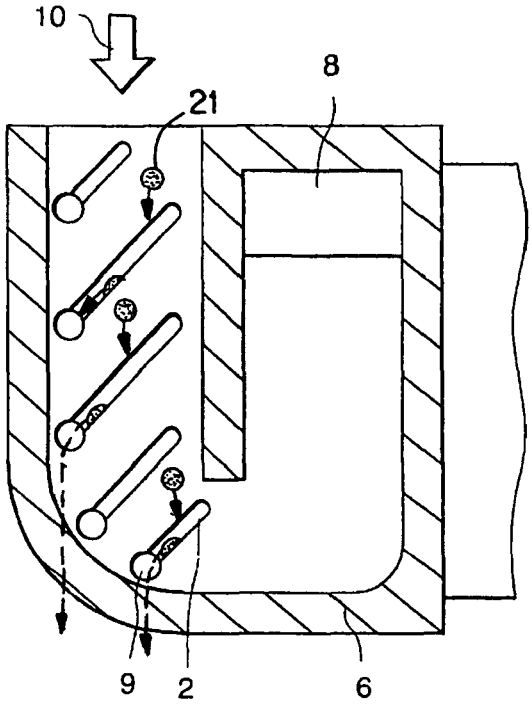
FIG. 11 is a partial section of the fifth embodiment of a thermal type flow rate measuring device according to the present invention.

The fifth embodiment shown in FIG. 11 is formed with a plurality of tilted grooves 2 oblique relative to the flow axis of the fluid, on the inner periphery of the U-shaped auxiliary passage 6. Also, on downstream side ends of the grooves 2, water drainage through holes 9 are formed.

It should be noted that, in FIG. 11, the flow rate measuring sensor element 4 arranged within the auxiliary passage 6 is eliminated from illustration but is indeed arranged in the similar manner as the former embodiment.

In the construction of the fifth embodiment of the present invention, the capturing means of water droplet 21 is the grooves 2, and discharging means is the through holes 9 formed at the downstream portion of the grooves. With the construction where a plurality of water droplet discharging through holes 9, even when large amount of water droplets penetrate into the auxiliary passage 6, water droplets 21 may be efficiently discharged.

On the other hand, by forming the through holes 9 in the inner periphery of the auxiliary passage 6, flow velocity of the fluid in the auxiliary passage 6 can be improved.

Namely, when the through holes are not formed in the inner periphery of the auxiliary passage 6, while the fluid flow velocity can be high at the center portion of the auxiliary passage 6, the fluid may be retained in the vicinity of the inner periphery. Therefore, as considered the whole auxiliary passage 6, fluid flow velocity becomes lower than flow velocity of the fluid in the main passage.

In contrast to this, when the through holes are formed in the inner periphery of the auxiliary passage 6, since the through holes are communicated with the main passage, portion retaining the fluid can be reduced to improve flow velocity of the fluid in the auxiliary passage 6.

It should be noted that even when the grooves and the beam-like ridges are formed in the inner periphery of the auxiliary passage 6, portion retaining the fluid can be reduced to improve flow velocity of the fluid in the auxiliary passage 6.

Next, the sixth embodiment of the thermal type flow rate measuring device according to the present invention will be discussed with reference to FIGS. 12 and 13.

Figure 12:
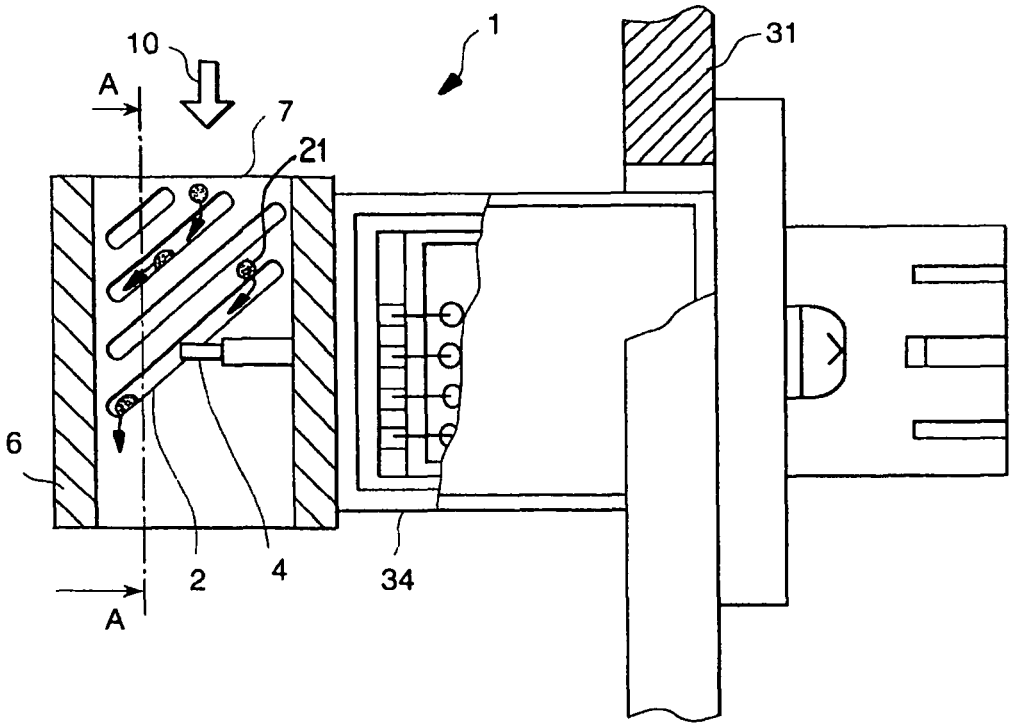
FIG. 12 is a partial section of the sixth embodiment of a thermal type flow rate measuring device according to the present invention.
Figure 13:
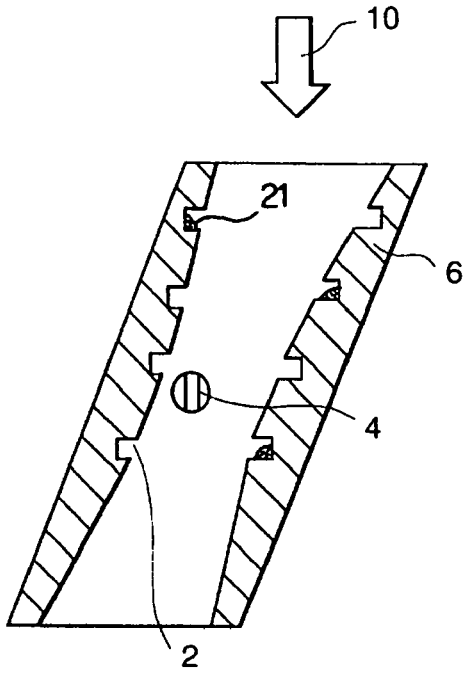
FIG. 13 is a section taken along line B-B of the thermal type flow rate measuring device shown in FIG. 12.

FIG. 12 is a partial section of the sixth embodiment of the thermal type flow rate measuring device 1 according to the present invention, and FIG. 13 is a section taken along line A-A of FIG. 12.

As shown in FIG. 12, the flow rate measuring sensor element 4 is disposed within a straight pipe form auxiliary passage 6, and a plurality of grooves 2 tilted relative to flow of the air are formed in the inner periphery of the auxiliary passage 6. As shown in FIG. 13, the straight pipe form auxiliary passage 6 has tilted structure relative to the flow direction of the air, and the water droplets 21 or the like do not directly collide on the flow rate measuring sensor element 4.

However, even with such construction, if the grooves 2 are not formed on the inner periphery of the auxiliary passage 6, the water droplet 21 may adhere on the flow rate measuring sensor element 4 in the mechanism discussed in connection with FIG. 5.

Advantage of the sixth embodiment of the thermal type flow rate measurement device according to the present invention can prevent adhesion of the water droplets even in simple straight pipe form auxiliary passage 6. It should be noted that comparable effect may be achieved even with the beam-like ridges 3 or combination of the grooves and ridges, in place of the grooves 2.

Next, the seventh embodiment of the thermal type flow rate measuring device according to the present invention will be discussed with reference to FIG. 14.

Figure 14:
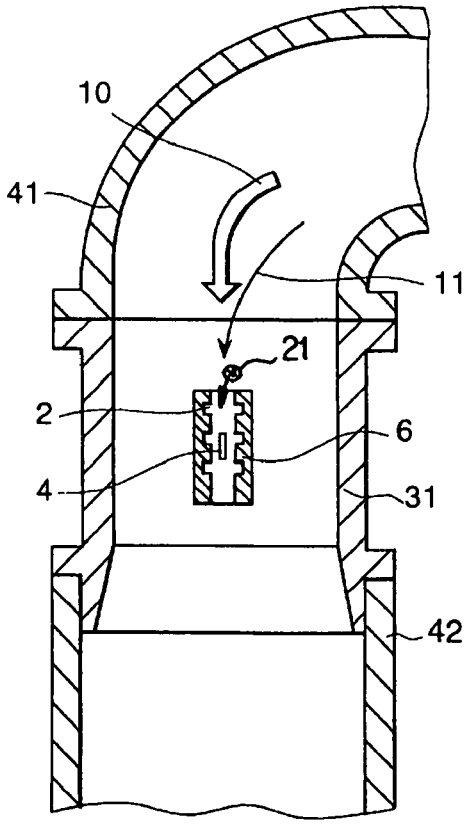
FIG. 14 is a partial section of the seventh embodiment of a thermal type flow rate measuring device according to the present invention.

As shown in FIG. 14, an upstream side end of the main passage 31 is connected to a bent upstream side duct 41, and a downstream side end of the main passage 31 is connected to a straight duct 42. Within the main passage 31, the straight pipe form auxiliary passage 6 is disposed. On the inner periphery of the auxiliary passage 6, the grooves 2 are formed. While not clearly illustrated, these grooves 2 are titled relative to the flow direction of the fluid as illustrated in FIG. 12.

By bent upstream side duct 41, flow 11 of water droplets passing through the main passage 31 and the auxiliary passage 6 is bent by inertia effect. Therefore, even with the straight pipe form auxiliary passage 6, most of the water droplets 21 may not collide on the flow rate measuring sensor element 4.

However, because of the amount of water droplets 21 adhering on the side wall of the auxiliary passage 6, adhesion of water droplets on the flow rate measuring sensor element 4 cannot be avoided satisfactorily without use the present invention, in which the grooves 2 are formed on the inner periphery.

It should be noted that a comparable effect may be achieved even with the beam-like ridges 3 or a combination of the grooves and ridges, in place of the grooves 2. In another alternative, when water droplets 21 splash on the inner periphery of the auxiliary passage 6 to splash the water droplets as a reaction, it would be effective to form a hydrophilic film having hydrophilic property on the inner periphery.

It should be noted that "hydrophilic" meant herein is to have contact angle between the hydrophilic film and water less than or equal to about 30°.

After experiments using surface active agent or the like, higher hydrophilic property may result in uniformity in wetting the inner periphery of the auxiliary passage 6 to reduce possibility of splashing of water droplets 21. In this case, even without the grooves 2 or beam-like ridges 3, sufficient water droplets 21 adhesion preventing effect can be achieved.

Next, the eighth embodiment of the thermal type flow rate measuring device according to the present invention will be discussed with reference to FIG. 15.

Figure 15:
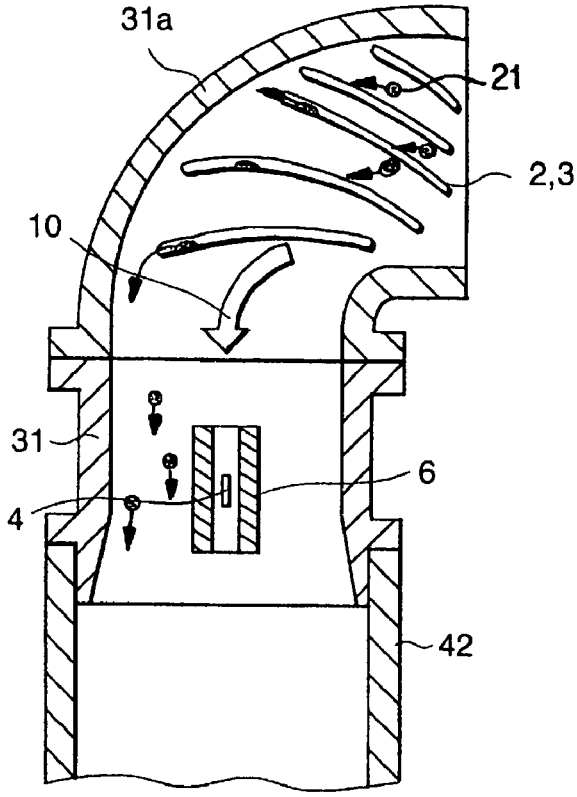
FIG. 15 is a partial section of the eighth embodiment of a thermal type flow rate measuring device according to the present invention.

As shown in FIG. 15, the main passages 31 and 31a is bent at a position in the vicinity of a site where the auxiliary passage 6 is mounted. On the inner periphery of the bent main passage 31a, a plurality of grooves 2 or a plurality of beam-like ridges 3 are formed. Water droplets penetrating into the main passage 31a adhere on the inner periphery in the vicinity of a bent portion of the main passage 31a by inertia effect.

Then, adhered water droplet is captured by a plurality of grooves or a plurality of beam-like ridges to prevent growth of water droplet to reduce splashing of water droplet to penetrate into the auxiliary passage 6.

It should be noted that, in the eighth embodiment of the present invention, discussion has been given in terms of the thermal type flow meter provided with the auxiliary passage 6, prevention of adhering of water droplet on the thermal type flow rate measuring device 1 even without providing the auxiliary passage can be achieved by taking measure for preventing splashing of water droplets in the main passage. Therefore, it becomes unnecessary to form the auxiliary passage to contribute for lowering of cost of the thermal type flow rate measuring device.

On the other hand, in case of the vehicle having air intake, into which water droplets easily penetrate, the measure for preventing splashing of water droplets is taken even for the inner periphery of the auxiliary passage, further improvement can be achieved.

It should be noted that comparable effect may be expected even by forming the hydrophilic film on the inner periphery of the bent portion in place of the plurality of grooves or a plurality of beam-like ridges.

Figure 16:
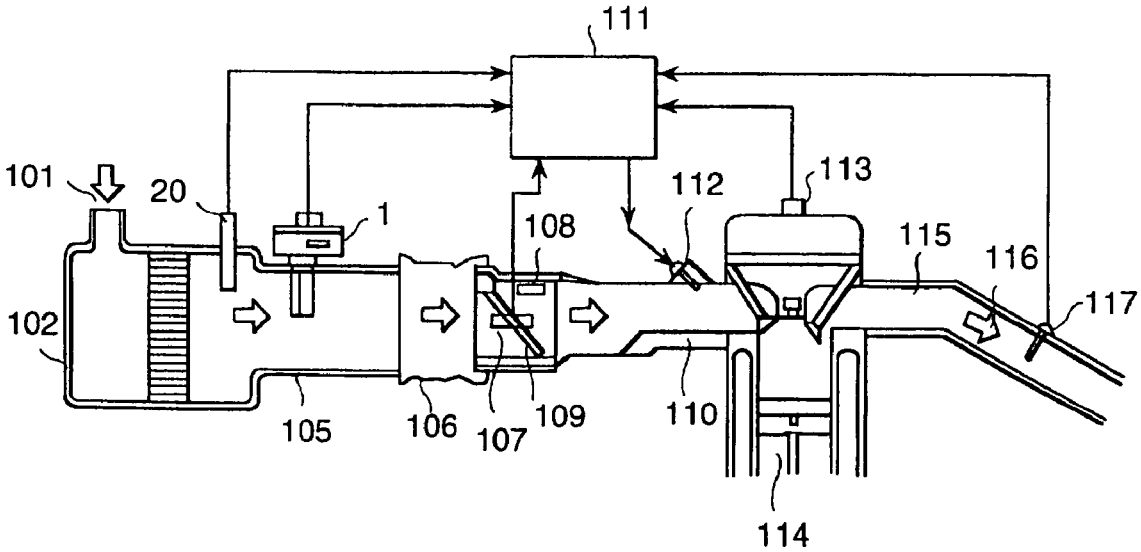
FIG. 16 is a section showing an example of the case where the thermal type flow rate measuring device according to the present invention in the case for measuring intake air flow rate in an internal combustion engine, particularly gasoline engine.

FIG. 16 is a section showing an example of the case where the thermal type flow rate measuring device according to the present invention is applied for measurement of air flow rate in an internal combustion engine, particularly gasoline engine.

In FIG. 16, an air cleaner 102, a body 105, a duct 106, a throttle angle sensor 107, an idle air control valve 108, a throttle body 109 are assembled with an intake manifold 110 for integration to form an air intake passage.

An intake air 101 to the engine is detected flow rate by the thermal type flow rate sensor 1 according to the present invention while passing through the air intake passage or through a bypass passage. The detected flow rate signal is input to a control unit 111 in a form of voltage, frequency or the like to be used for controlling combustion portion and sub-system thereof constituted of an injector 112, a revolution speed sensor 113, an engine cylinder 114, an exhaust manifold 115, a gas 116, an oxygen concentration sensor 117.

By applying the thermal type flow rate measuring device according to the present invention for controlling the combustion portion and sub-system, adhesion of water droplets, oil droplets and so forth on the sensor element can be prevented to permit accurate measurement of intake air flow rate to improve precision of engine control.

It should be noted that while not illustrated, since diesel engine has substantially the same basic construction, the present invention is applicable.

On the other hand, the present invention is applicable for measurement of not only air flow rate but also flow rate of other fluid. For example, the present invention is applicable even for measurement of flow rate of hydrogen gas of the fuel cell. As applied to measurement of hydrogen gas, gas with 100% humidity is used to easy cause water droplet. Therefore, by applying the present invention, precision in measurement can be improved. Furthermore, the present invention is applicable for measurement of flow rate of propane gas.

Since the present invention is constructed by forming a capturing means for a liquid, such as water droplet, oil droplet or the like in the auxiliary passage or the main passage, and by discharging the captured liquid via a passage separated from the flow rate detecting sensor element, adhesion of the liquid, such as water droplet or the like on the flow rate detecting sensor element is successfully prevented to provide thermal type flow rate measuring device with high reliability.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A thermal type flow rate measuring device comprising:

an auxiliary passage defined within a main passage for introducing a part of fluid flowing through said main passage;

a thermal type flow rate measuring sensor disposed within said auxiliary passage for detecting flow rate of the fluid; and capturing means *including one of at least one groove and at least one protrusion* formed on an inner periphery of said auxiliary passage for capturing liquid contained in said fluid and transferring the captured liquid from said capturing means.

2. A thermal type flow rate measuring device as set forth in claim 1, which further comprises means for discharging the liquid captured by said capturing means to an outside portion of said auxiliary passage.

3. A thermal type flow rate measuring device as set forth in claim 2, wherein [at least one of said capturing means and said discharging means is formed with one of a plurality of grooves and a plurality of beam-like ridges,] said captured liquid [being] *is* transferred along [said one of said plurality of grooves said plurality of beam-like ridges] *said one of at least one groove and at least one protrusion*.

4. A thermal type flow rate measuring device as set forth in claim 3, wherein [one of a plurality of grooves and a plurality of beam-like ridges] *said one of at least one groove and at least one protrusion* extends from upstream side to downstream side in said auxiliary passage in a manner directed from portions on said inner periphery of said auxiliary passage where liquid passing through said auxiliary passage is hardly concentrated to portions on said inner periphery of said auxiliary passage where said liquid passing through said auxiliary passage is easily concentrated at said portions on said inner periphery of said auxiliary passage.

5. A thermal type flow rate measuring device as set forth in claim 3, wherein [one of a plurality of grooves and a plurality of beam-like ridges] *said one of at least one groove and at least one protrusion* extends from an upstream side to downstream side in said auxiliary passage in a manner directed from portions of said inner periphery of said auxiliary passage where centrifugal force to be applied is small to portions of said inner periphery of said auxiliary passage where centrifugal force to be applied is large at said portions of said inner periphery of said auxiliary passage.

6. A thermal type flow rate measuring device as set forth in claim 3, wherein [one of a plurality of grooves and a plurality of beam-like ridges] *said one of at least one groove and at least one protrusion* extends obliquely relative to flow direction of the fluid.

7. A thermal type flow rate measuring device as set forth in claim 2, wherein at least one of said capturing means and said discharge means has hydrophilic characteristics on said inner periphery of said auxiliary passage so that when the liquid adheres on said inner periphery of said auxiliary passage, a contact angle [being] *is* less than or equal to 30°.

8. A thermal type flow rate measuring device as set forth in claim 2, wherein [at least one of said capturing means and said discharging means is one of a plurality of grooves and a plurality of beam-like ridges, and another] *a separate* groove *is* coupled with [one of a plurality of grooves and a plurality of beam-like ridges] *said one of at least one groove and at least one protrusion and* extends from a portion of said inner periphery of said auxiliary passage in a vicinity of an inlet portion of said auxiliary passage and a portion of said inner periphery of said auxiliary passage in a vicinity of an outlet portion of said auxiliary passage.

9. A thermal type flow rate measuring device as set forth in claim 2, said capturing means is a plurality of grooves formed on said inner periphery of said auxiliary passage, and said inner periphery of said auxiliary passage of portions other than those formed by said plurality of grooves are provided with water repellent characteristics so that when the liquid adheres on said inner periphery of said auxiliary passage, a contact angle thereof being greater than or equal to about 90°.

10. A thermal type flow rate measuring device as set forth in claim 2, wherein said capturing means is a plurality of grooves formed in said inner periphery of said auxiliary passage, and said discharging means comprises through-holes formed on at a downstream side of said plurality of grooves in communication with said plurality of grooves.

11. A thermal type flow rate measuring device comprising:

a thermal type flow rate measuring sensor provided within a main passage through which fluid flows for measuring flow rate of the fluid in said main passage;

said main passage being curved in a vicinity of an upstream side of said flow rate measuring sensor; and capturing means *including one of at least one groove and at least one protrusion* formed on an inner periphery of said main passage for capturing liquid carried by the fluid.

12. A thermal type flow rate measuring device in a vehicle control system including a thermal type flow rate control device, a control unit for controlling a vehicle on the basis of a condition of the vehicle detected by said thermal type flow rate measuring sensor, the thermal type flow rate measuring device including an auxiliary passage introducing a part of fluid flowing through a main passage, and a thermal type flow rate measuring sensor for detecting flow rate of the fluid[, for detecting flow rate of the liquid],

[at least one of] a liquid capturing means [and discharging means being] *including one of at least one groove and at least one protrusion* provided on an inner periphery of said auxiliary passage.

*13. A flow rate measuring device incorporated in a first passage, for measuring a flow rate of fluid flowing through the first passage, comprising,*

*a first opening for introducing a part of the fluid flowing through the first passage,*

*a second opening for discharging at least a part of the introduced fluid into the first passage;*

*a second passage through which the fluid introduced through the first opening and discharged from the second opening flows;*

*a thermal type sensor arranged in the second passage between the first opening and the second opening, for measuring a flow rate of the fluid;*

*a third opening arranged at a position where at least another part of the fluid introduced from the first opening can reach without said at least another part of the fluid passing by a position of the sensor, and communicated with the first passage, and*

*a groove formed on an inner periphery between the first opening and the third opening.*

*14. A flow rate measuring device incorporated in a first passage, for measuring a flow rate of fluid flowing through the first passage, comprising,*

*a first opening for introducing a part of the fluid flowing through the first passage,*

*a second opening for discharging at least a part of the introduced fluid into the first passage;*

*a second passage through which the fluid introduced through the first opening and discharged from the second opening flows;*

*a thermal type sensor arranged in the second passage between the first opening and the second opening, for measuring a flow rate of the fluid;*

*a third opening arranged at a position where at least another part of the fluid introduced from the first opening can reach without said at least another part of the fluid passing by a position of the sensor, and communicated with the first passage, and*

*a protrusion provided on an inner periphery between the first opening and the third opening.*

*15. A fluid flow rate measuring device, comprising:*

*a first opening for receiving fluid;*

*a second opening for discharging at least a part of said fluid;*

*a thermal flow rate sensor arranged between said first opening and said second opening;*

*at least one third opening; and*

*a capturing structure including at least one of at least one groove and at least one protrusion formed between said first opening and respective ones of said at least one third opening, wherein said capturing structure removes liquid contained in said fluid and discharges said liquid through said at least one third opening.*

*16. A thermal type flow rate measuring device comprising:*

*a passage for receiving fluid;*

*a thermal type flow rate measuring sensor disposed within said passage for detecting flow rate of the fluid; and*

*a capturing structure including at least one of at least one groove and at least one protrusion formed on an inner periphery of said passage for capturing liquid contained*

*in said fluid and for transferring the captured liquid away from said capturing structure.*

*17. A thermal type flow rate measuring device as set forth in claim 16, which further comprises a discharging structure for discharging the liquid captured by said capturing structure to outside of said passage.*

*18. A thermal type flow rate measuring device as set forth in claim 17, wherein said captured liquid is transferred along said at least one of at least one groove and at least one protrusion.*

*19. A thermal type flow rate measuring device as set forth in claim 18, wherein said at least one of at least one groove and at least one protrusion extends from upstream side to downstream side in said passage in a manner directed from portions on an inner periphery of said passage where liquid passing through said passage is hardly concentrated to portions on said inner periphery of said passage where said liquid passing through said auxiliary passage is easily concentrated at said portions on said inner periphery of said passage.*

*20. A thermal type flow rate measuring device as set forth in claim 18, wherein extends from an upstream side to downstream side in said passage in a manner directed from portions of said inner periphery of said passage where centrifugal force to be applied is small to portions of said inner periphery of said passage where centrifugal force to be applied is large at said portions of said inner periphery of said passage.*

*21. A thermal type flow rate measuring device as set forth in claim 18, wherein said at least one of at least one groove and at least one protrusion extends obliquely relative to flow direction of the fluid.*

*22. A thermal type flow rate measuring device as set forth in claim 17, wherein at least one of said capturing structure and said discharge structure has hydrophilic characteristics on an inner periphery of said passage so that when the liquid adheres on said inner periphery of said passage, a contact angle is less than or equal to 30 degrees.*

*23. A thermal type flow rate measuring device as set forth in claim 17, wherein a separate groove is coupled with said at least one of at least one groove and at least one protrusion and extends from a portion of an inner periphery of said passage in a vicinity of an inlet portion of said passage and a portion of said inner periphery of said passage in a vicinity of an outlet portion of said passage.*

*24. A thermal type flow rate measuring device as set forth in claim 17, wherein said capturing structure is a plurality of grooves formed on an inner periphery of said passage, and said inner periphery of said passage of portions other than those formed by said plurality of grooves are provided with water repellent characteristics so that when the liquid adheres on said inner periphery of said passage, a contact angle thereof being greater than or equal to about 90°.*

*25. A thermal type flow rate measuring device as set forth in claim 17, wherein said capturing structure is a plurality of grooves formed in an inner periphery of said passage, and said discharging structure comprises through-holes formed on at a downstream side of said plurality of grooves in communication with said plurality of grooves.*

*26. A thermal type flow rate measuring device comprising:*

*a thermal type flow rate measuring sensor provided within a main passage through which fluid flows for measuring flow rate of the fluid in said main passage;*

*said main passage being curved in a vicinity of an upstream side of said flow rate measuring sensor; and*

*a capturing device including at least one of at least one groove and at least one protrusion formed on an inner periphery of said main passage for capturing liquid carried by the fluid.*

*27. A thermal type flow rate measuring device in a vehicle control system including a thermal type flow rate control device, a control unit for controlling a vehicle on the basis of a condition of the vehicle detected by said thermal type flow rate measuring sensor, the thermal type flow rate measuring device including a passage introducing a part of fluid flowing in the vicinity of said measuring device, and a thermal type flow rate measuring sensor for detecting flow rate of the fluid,*

*a liquid capturing structure including at least one of at least one groove and at least one protrusion provided on an inner periphery of said passage.*

*28. A vehicle engine control system including a control unit for controlling a vehicle on the basis of a condition of the vehicle detected by a thermal type flow rate measuring device, the thermal type flow rate measuring device including a passage introducing a part of fluid flowing through a portion of said vehicle engine, and a liquid capturing means including at least one of at least one groove and at least one protrusion provided on an inner periphery of said passage.*

* * * * *